United States Patent
Rajendran et al.

(10) Patent No.: US 10,148,555 B2
(45) Date of Patent: Dec. 4, 2018

(54) MULTI-CHASSIS LAG ACCESS NODE DETERMINATION SYSTEM

(71) Applicant: Dell Products L.P., Round Rock, TX (US)

(72) Inventors: Pugalendran Rajendran, Katoor (IN); Namasivayan Manokar, Chennai (IN); Anand Sundaresh Natarajan, Chennai (IN); Senthil Nathan Muthukaruppan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 14/958,528

(22) Filed: Dec. 3, 2015

(65) Prior Publication Data
US 2017/0163524 A1    Jun. 8, 2017

(51) Int. Cl.
*H04L 12/709* (2013.01)
*H04L 12/733* (2013.01)
*H04L 12/729* (2013.01)

(52) U.S. Cl.
CPC .......... *H04L 45/245* (2013.01); *H04L 45/122* (2013.01); *H04L 45/125* (2013.01)

(58) Field of Classification Search
None
See application file for complete search history.

(56) References Cited

U.S. PATENT DOCUMENTS

| | | | |
|---|---|---|---|
| 2005/0025058 A1* | 2/2005 | Chaudhuri | H04L 45/12 370/238 |
| 2013/0064137 A1* | 3/2013 | Santoso | H04L 49/70 370/254 |
| 2014/0146664 A1* | 5/2014 | Amante | H04L 45/50 370/228 |
| 2014/0211632 A1* | 7/2014 | Saad | H04L 45/62 370/238 |
| 2014/0362736 A1* | 12/2014 | Ramanathan | H04L 12/24 370/254 |
| 2016/0277959 A1* | 9/2016 | Venkataraman | H04L 45/125 |

* cited by examiner

*Primary Examiner* — Charles C Jiang
*Assistant Examiner* — Saad Khawar
(74) *Attorney, Agent, or Firm* — Haynes and Boone, LLP (57) ABSTRACT

A LAG access node determination system includes directly-linked networking node devices are each directly linked to a networking switch device by respective links that are aggregated in a multi-chassis LAG provided by the networking switch device. An indirectly-linked networking node device is coupled between the directly-linked networking node devices and is not directly linked to the networking switch device. The indirectly-linked networking node device receives a first packet that includes a destination that is reachable through the multi-chassis LAG provided by the networking switch device, determines a first directly-linked networking node device of the plurality of directly-linked networking node devices that is coupled to the indirectly-linked networking node device by a first shortest path, and provides the first packet along the first shortest path to the first directly-linked networking node device in order to forward the first packet through the multi-chassis LAG.

20 Claims, 8 Drawing Sheets

MULTI-CHASSIS LAG ACCESS NODE DETERMINATION SYSTEM

BACKGROUND

The present disclosure relates generally to information handling systems, and more particularly to determining an information handling system through which to access a multi-chassis Link Aggregation Group (LAG).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, networking switches, are configured to aggregate multiple links to the networking switch using Link Aggregation Groups (LAGs) in order to increase throughput beyond what a single link can sustain, to provide redundancy in the event one or more links fail, and/or to provide a variety of other LAG benefits known in the art. In some situations, such networking switches may utilize multi-chassis LAGs that aggregate links that connect to different networking nodes. For example, Virtual Link Trunking (VLT) is an aggregation protocol that may be used on Top Of Rack (TOR) networking switches to aggregate links to different networking nodes connected to the TOR networking switch. In some situations, a VLT LAG may be provided on a TOR networking switch for respective direct links to a plurality of networking nodes ("directly-linked networking nodes"), and that plurality of directly-linked networking nodes may be connected together by inter-chassis links to one or more networking nodes that do not have a direct link to the TOR networking switch that is a part of the VLT LAG ("indirectly-linked networking nodes"). The connection of directly-linked networking nodes by indirectly-linked networking nodes raises a number of issues.

For example, when an indirectly-linked networking node receives traffic that must be forwarded through the TOR networking switch using the VLT LAG, that indirectly-linked networking node must send that traffic through a directly-linked networking node to reach the VLT LAG. In conventional VLT LAG systems that include directly-linked networking nodes that are connected by indirectly-linked networking nodes, one of the directly-linked networking nodes is typically designated as a LAG access networking node that is then used by all of the indirectly-linked networking nodes to send traffic that must be forwarded through the TOR networking switch using the VLT LAG (i.e., all of the indirectly-linked networking nodes provide any traffic that must be forwarded through the TOR networking switch using the VLT LAG through that LAG access networking node). Such conventional VLT LAG systems often provide non-optimal traffic routing and do not provide load balancing (i.e., because all traffic from indirectly-linked networking nodes must flow through the same LAG access networking node). One solution to this problem is to designate different LAG access networking nodes for different subsets of the indirectly-linked networking nodes (e.g., based on the Virtual Local Area Network (VLAN) accessible through that LAG access networking node). However, the directly-linked networking node designated as the LAG access networking node for a given subset of indirectly-linked networking nodes will often not be the optimal networking node through which a particular indirectly-linked networking node should forward traffic, thus resulting in non-optimal traffic routing that produces traffic delays and/or reduced traffic throughput.

Accordingly, it would be desirable to provide a LAG access networking node determination system.

SUMMARY

According to one embodiment, an information handling system (IHS) includes a communication system that is configured to couple to a plurality of directly-linked networking node devices that are each directly linked to a networking switch device by respective links that are aggregated in a multi-chassis Link Aggregation Group (LAG) provided by the networking switch device, wherein the communication system is not directly linked to the networking switch device; a processing system coupled to the communication system; and a memory system coupled to the processing system and including instruction that, when executed by the processing system, cause the processing system to provide a LAG access determination engine that is configured to: receive, through the communication system, a first packet that includes a destination that is reachable through the multi-chassis LAG provided by the networking switch device; determine a first directly-linked networking node device of the plurality of directly-linked networking node devices that is coupled to the communication system by a first shortest path; and provide, through the communication system, the first packet along the first shortest path to the first directly-linked networking node device in order to forward the first packet through the multi-chassis LAG.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
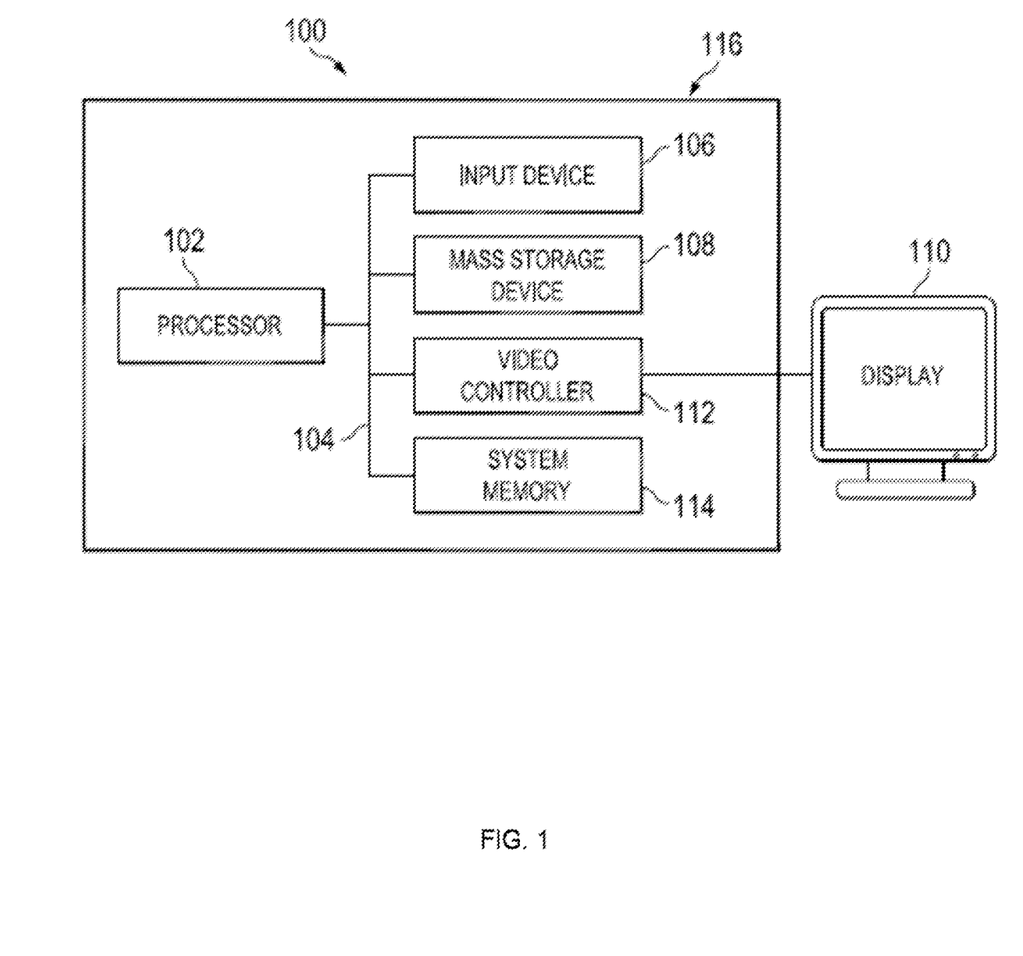
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
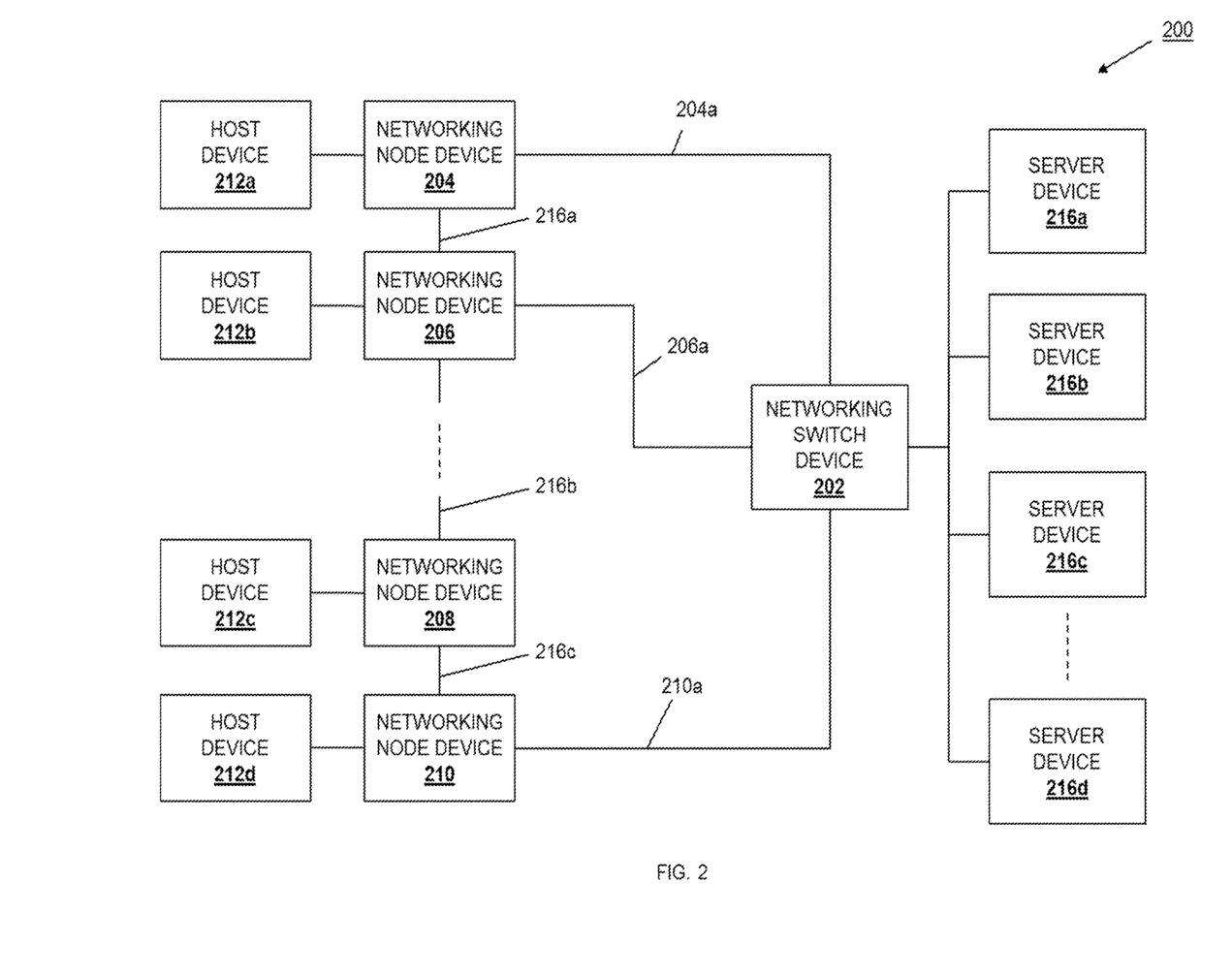
FIG. 2 is a schematic view illustrating an embodiment of a LAG access node determination system.

Referring now to FIG. 2, an embodiment of a multi-chassis Link Aggregation Group (LAG) access node determination system 200 is illustrated. In the illustrated embodiment, the multi-chassis LAG access node determination system 200 includes a networking switch device 202 that may be the IHS 100 discussed above with reference to FIG. 1 and/or include some or all of the components of the IHS 100. In a specific example, the networking switch device 202 is a Top Of Rack (TOR) switch that is provided on a rack in a datacenter, but one of skill in the art in possession of the present disclosure will recognize that a variety of other networking switch devices that are configured to provide a multi-chassis LAG (discussed below) will fall within the scope of the present disclosure. The networking switch device 202 is coupled to a plurality of networking node devices 204, 206, and up to 208 and 210. Any or all of the networking node devices 204-210 may be the IHS 100 discussed above with reference to FIG. 1 and/or include some or all of the components of the IHS 100. In some examples, the networking node devices 204-210 may include switches, routers, access points, and/or other networking node devices that are configured to receive and forward traffic. In the illustrated embodiment, a single networking switch device 202 has been provided for clarity of illustration and discussion, but one of skill in the art will recognize that multiple networking switch devices (e.g., TOR switches) may (and typically will) be provided while remaining within the scope of the present disclosure.

In the illustrated embodiment, the networking node device 204 is directly connected to the networking switch device 202 by a network connection 204a, the networking node device 206 is directly connected to the networking switch device 202 by a network connection 206a, and the networking node device 210 is directly connected to the networking switch device 202 by a network connection 210a. For example, the network connections 204a, 206a, and 210a may include a variety of networking cables (e.g., Ethernet or other communications cables), wireless network connections provided by wireless communications devices, and/or other network connections known in the art. In the illustrated embodiment, the networking node device 208 is not directly connected to the networking switch device 202 by a network connection, and as discussed below must provide any traffic that includes a destination that is reachable through the networking switch device 202 through one of the networking node devices that is directly connected to the networking switch device 202 by a network connection. In the illustrated embodiment, the networking node device 204 is coupled to the networking node device 206 by one or more network connections 216a, the networking node device 206 is coupled to the networking node device 208 by one or more network connections 216b, and the networking node device 208 is coupled to the networking node device 210 by one or more network connections 216c. In the illustrated embodiment, only a few network connections between the networking switch device 202 and the networking node devices 204-210 have been provided for clarity of illustration and discussion, but one of skill in the art will recognize that many more networking connections may (and typically will) be provided between the networking node devices 204-210 and to any number of networking switch devices 202 while remaining within the scope of the present disclosure.

In the illustrated embodiment, the networking node device 204 is coupled to a host device 212a, the networking node device 206 is coupled to a host device 212b, the networking node device 208 is coupled to a host device 212c, and the networking node device 206 is coupled to a host device 212d. Any or all of the host devices 212a-d may be the IHS 100 discussed above with reference to FIG. 1 and/or include some or all of the components of the IHS 100. For example, the host devices 212a-d may be any of a variety of devices (e.g., server devices, storage devices, networking devices, desktop computing devices, mobile computing devices, and/or other computing devices known in the art) that are configured to direct traffic towards the networking switch device 202. Furthermore, the networking switch device 202 is coupled to a plurality of server devices 216a, 216b, 216c, and up to 216d that each may be the IHS 100 discussed above with reference to FIG. 1 and/or include some or all of the components of the IHS 100. In the examples provided below, the server devices 216a-d may be positioned in a rack that includes a TOR switch that is provided by the networking switch device 202. However, one of skill in the art in possession of the present disclosure will recognize that the server devices 216a-d may be replaced by other devices (e.g., storage devices) that may have traffic directed to them by the host devices 212a-d while remaining within the scope of the present disclosure. While a specific examples of the LAG access node determination system 200 is illustrated and described herein, one of skill in the art in possession of the present disclosure will recognize that a variety of modifications to the devices, configuration, and/or other aspects of the LAG access node determination system 200 will fall within the scope of the present disclosure.

Figure 3A:
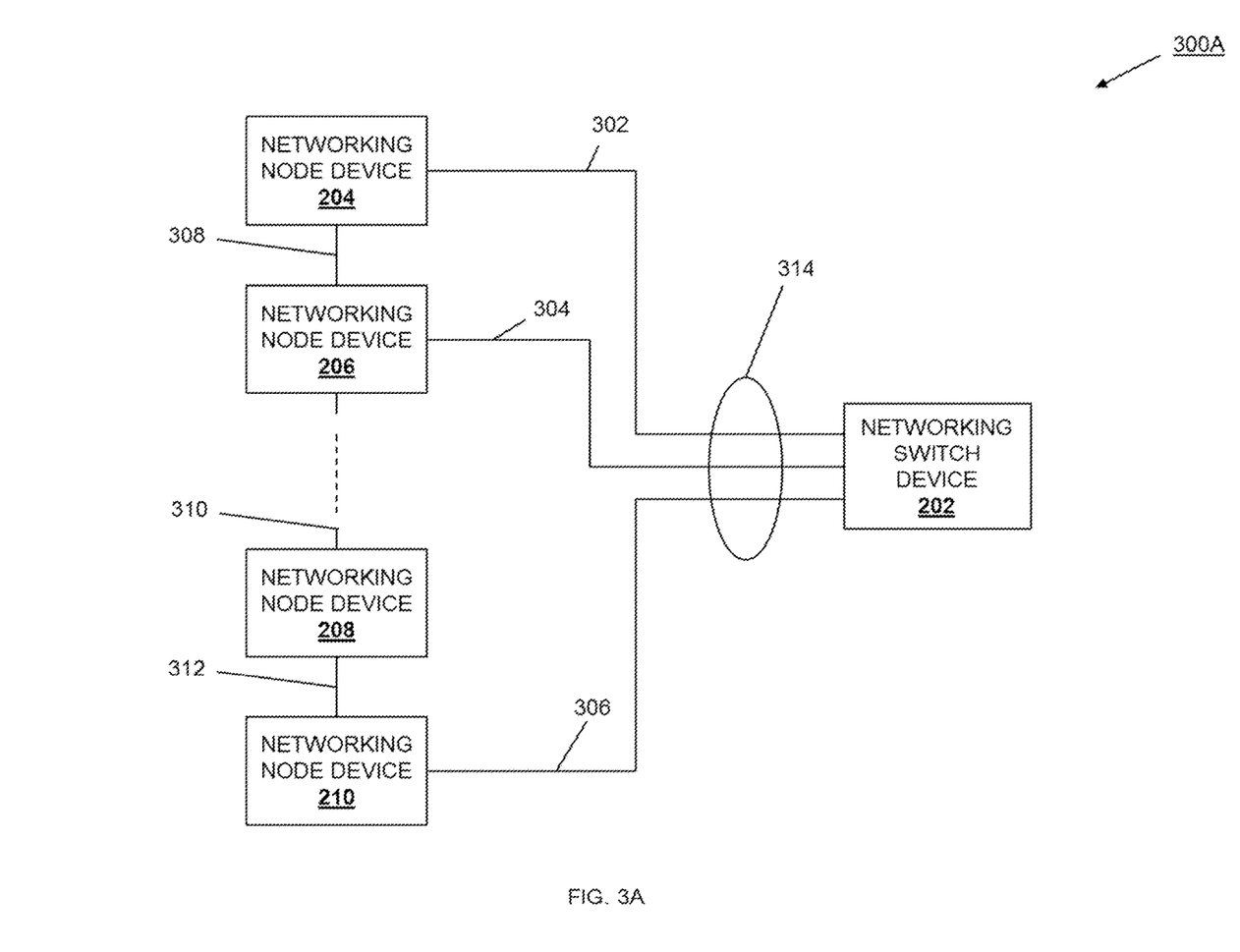
FIG. 3A is a schematic view illustrating an embodiment of a multi-chassis LAG provided by the LAG access node determination system of FIG. 2.

Referring now to FIG. 3A, an embodiment of a first networked situation 300A provided by the LAG access node determination system 200 of FIG. 2 is illustrated. In FIG. 3A, the host devices 212a-d and server devices 216a-d in the LAG access node determination system 200 of FIG. 2 have been omitted for clarity of illustration and discussion, and the network connections 204a, 206a, 210a, and 216a-c have been replaced with one or more links that may be provided by those network connections. In the illustrated embodiment of the first networked situation 300A, the networking node device 204 is directly linked to the networking switch device 202 by one or more links 302 that may be provided by the network connection 204a, the networking node device 206 is directly linked to the networking switch device 202 by one or more links 304 that may be provided by the network connection 206a, and the networking node device 210 is directly linked to the networking switch device 202 by one or more links 306 that may be provided by the network connection 210a. The links 302, 304, and 306 may be provided using any of a variety of communication protocols known in the art. Furthermore, the networking node device 208 has no direct link to the networking switch device 202 due to, for example, the lack of a direct network connection to the networking switch device 202 as discussed above with reference to FIG. 2. In the discussions below of the first networked situation 300A, the networking node devices 204, 206, and 208 may be referred to as "directly-linked networking node devices" due to their direct links to the networking switch device 202, while the networking node device 208 may be referred to as an "indirectly linked networking node device" due to its lack of a direct link to the networking switch device 202. While in the first networked situation 300A, the lack of direct links to the networking switch device 202 is discussed as being due to the lack of a direct network connection, as discussed below, the lack of a direct link may be due to a variety of other situations known in the art.

In the illustrated embodiment, the networking node device 204 is coupled to the networking node device 206 by one or more links 308, the networking node device 206 is coupled to the networking node device 208 by one or more links 310, and the networking node device 208 is coupled to the networking node device 210 by one or more links 312. The links 308, 310, and 312 may be referred to as Inter-Port Links (IPLs) and provided using any of a variety of communication protocols known in the art. In the illustrated embodiment, only a few links between the networking switch device 202 and the networking node devices 204-210 have been provided for clarity of illustration and discussion, but one of skill in the art will recognize that many more links may (and typically will) be provided between the networking node devices 204-210 and any number of networking switch devices 202 while remaining within the scope of the present disclosure.

In the illustrated embodiment of the first networked situation 300A, the networking switch device 202 is providing a multi-chassis LAG 314 by aggregating the links 302, 304, and 306. In a specific example, the networking switch device 202 may be any of a variety of networking switches provided by DELL®, Inc. of Round Rock, Tex., United States that are configured to perform Virtual Link Trunking (VLT) to provide a multi-chassis LAG that may be referred to as a VLT LAG that provides a VLT port that is directly accessible through each of the direct links in the VLT LAG. In such embodiments the IPLs provided by the links 308, 310, and 312 may be referred to as Inter-Chassis Links (ICLs). As such, FIG. 3A provides the first networked situation 300A that illustrates the networking switch device 202 providing a multi-chassis LAG/VLT LAG 314 that utilizes direct links 302, 304, and 306 to networking node devices 204, 206, and 210, with the networking node devices 204, 206, and 210 and a networking node device 208 that does not have a direct link to the networking switch device 202 that is part of the multi-chassis LAG/VLT LAG 314 coupled together by inter-port/inter-chassis links 308, 310, and 312.

Figure 3B:
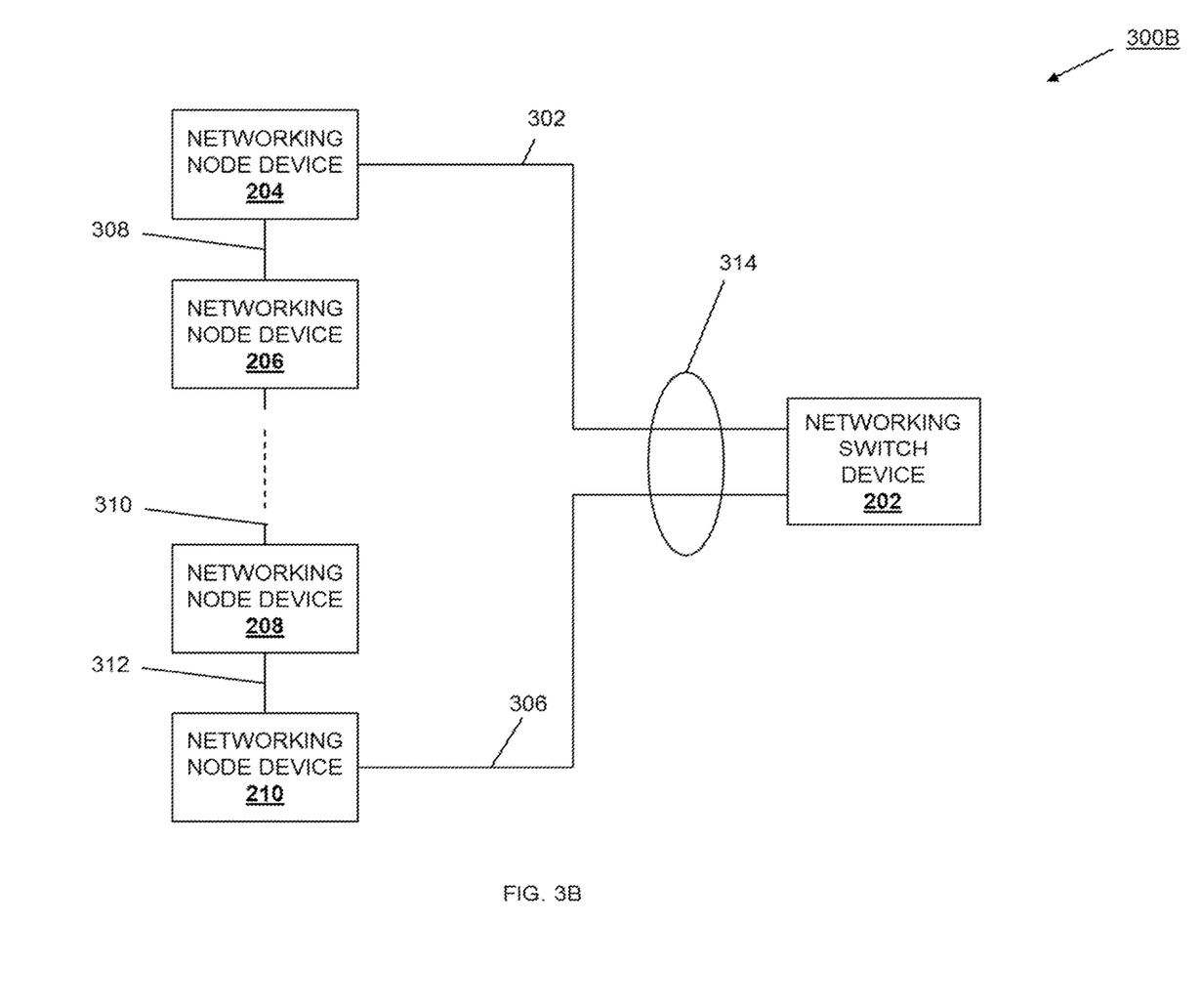
FIG. 3B is a schematic view illustrating an embodiment of a multi-chassis LAG provided by the LAG access node determination system of FIG. 2.

Referring now to FIG. 3B, an embodiment of a second networked situation 300B provided by the LAG access node determination system 200 of FIG. 2 is illustrated. Similarly to FIG. 3A, in FIG. 3B the host devices 212a-d and server devices 216a-d in the LAG access node determination system 200 of FIG. 2 have been omitted for clarity of illustration and discussion, and the network connections 204a, 206a, 210a, and 216a-c have been replaced with one or more links that may be provided by those network connections. Similarly to the first networking situation 300A, in the illustrated embodiment of the second networked situation 300A the networking node device 204 is directly linked to the networking switch device 202 by the one or more links 302 that may be provided by the network connection 204a, the networking node device 210 is directly linked to the networking switch device 202 by one or more links 306 that may be provided by the network connection 210a, and the networking node device 208 has no direct link to the networking switch device 202. In addition, the networking node device 206 (which is directly linked to the networking switch device 202 by the one or more links 304 that may be provided by the network connection 206a in the first networked situation 300A) has no direct link to the networking switch device 202 in the second networked situation 300B.

Similarly as discussed for the networking node device 208 in the first networked situation 300A, in some embodiments the networking node device 206 in the second networked situation 300B may lack the direct link to the networking switch device 202 due to, for example, the lack of a direct network connection to the networking switch device 202 (e.g., if the network connection 206a in FIG. 2 has not been provided). However, in some embodiments, the networking node device 206 in the second networked situation 300B may have a direct network connection to the networking switch device 202 (e.g., via the network connection 206a), but may lack the direct link to the networking switch device 2020 due to, for example, the failure of that link, and/or in response to a variety of other unavailable link situations known in the art. Similarly with the first networked situation 300A, in the discussions below of the second networked situation 300B the networking node devices 204 and 208 may be referred to as "directly-linked networking node devices" due to their direct links to the networking switch device 202, while the networking node devices 206 and 208 may be referred to as "indirectly linked networking node devices" due to their lack of a direct link to the networking switch device 202. As can be seen, the networking node devices 204, 206, 208, and 210 may be coupled together by the one or more links 308, 310, and 312. While a specific network topology is illustrated and described below, the systems and methods of the present disclosure are applicable to any of a variety of network topologies, including network topologies that may include loops (e.g., a ring topology) or other network features known in the art that have not been explicitly described herein.

In the illustrated embodiment of the second networked situation 300B, the networking switch device 202 is providing the multi-chassis LAG 314 by aggregating the links 302 and 306. Similarly as with the first networked situation 300A, the networking switch device 202 may be any of a variety of networking switches provided by DELL®, Inc. of Round Rock, Tex., United States that are configured to perform Virtual Link Trunking (VLT) to provide a multi-chassis LAG that may be referred to as a VLT LAG that provides a VLT port that is directly accessible through each of the direct links to the VLT LAG. In such embodiments the IPLs provided by the links 308, 310, and 312 may be referred to as Inter-Chassis Links (ICLs). As such, FIG. 3B provides the second networked situation 300B that illustrates the networking switch device 202 providing a multi-chassis LAG/VLT LAG 314 that utilizes direct links 302 and 306 to networking node devices 204 and 210, with the networking node devices 204 and 210 and the networking node devices 206 and 208 that do not have a direct link to the networking switch device 202 that is part of the multi-chassis LAG/VLT LAG 314 coupled together by inter-port/inter-chassis links 308, 310, and 312. However, other networking switch devices provided by other device manufacturers or vendors that provide other types of multi-chassis LAGs will benefit from the teachings of the present disclosure as well.

One of skill in the art in possession of the present disclosure will recognize that the first networked situation 300A and the second networked situation 300B provide only two of a variety of possible networked situations that may exist in the LAG access node determination system 200 due to, for example, the provisioning of network connections between the networking node device(s) 204, 206, 208, and/or 210 and/or the networking switch device 202, the removal of network connections between the networking node device(s) 204, 206, 208, and/or 210 and/or the networking switch device 202, the availability of links between the networking node device(s) 204, 206, 208, and/or 210 and/or the networking switch device 202, the unavailability of links network connections between the networking node device(s) 204, 206, 208, and/or 210 and the networking switch device 202, and/or a variety of other changes and/or modifications that will fall within the scope of the present disclosure. As such, one of skill in the art in possession of the present disclosure will recognize that a variety of changes to the LAG access node determination system 200 other than those explicitly illustrated and described herein may be responded to by the LAG access node determination system 200 using the teachings of the present disclosure.

Figure 4:
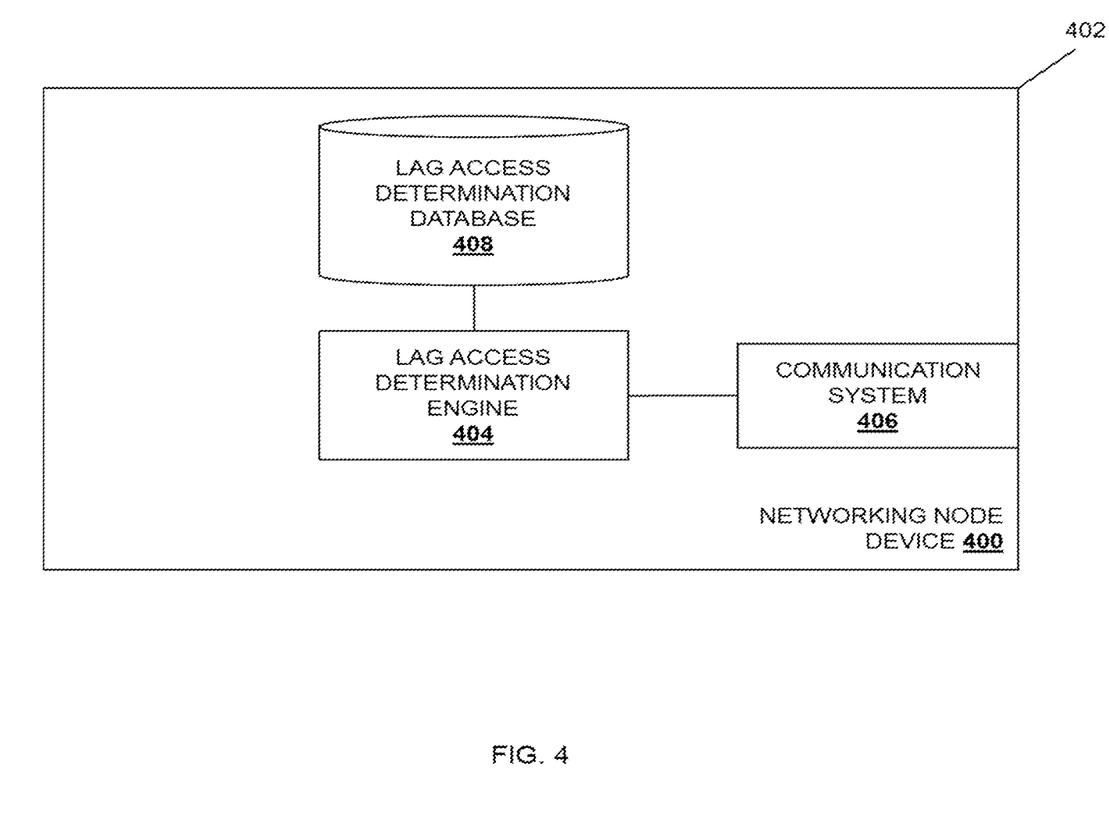
FIG. 4 is a schematic view illustrating an embodiment of a networking node device used in the LAG access node determination system of FIG. 2.

Referring now to FIG. 4, an embodiment of a networking node device 400 is illustrated. The networking node device 400 may be any of the networking node devices 204, 206, 208, and/or 210 discussed above with reference to FIGS. 2, 3A, and 3B. As such, the networking node device 400 may be the IHS 100 discussed above with reference to FIG. 1 and/or include some or all of the components of the IHS 100. The networking node device 400 includes a chassis 402 that houses the components of the networking node device 400, only some of which are illustrated in FIG. 4. The chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a LAG access determination engine 404 that is configured to perform the functions of the LAG access determination engine 404 and the networking node devices discussed below. The chassis 402 also houses a communication system 406 that is coupled to the LAG access determination engine 404 (e.g., via a coupling between the communication system and the processing system) and that may include a network interface controller (NIC), a wireless communication device, and/or a variety of other communication system components known in the art.

The chassis 402 also houses a storage system (not illustrated, but which may include the storage device 108 discussed above with reference to FIG. 1) that includes a LAG access determination database 408. As discussed below, the LAG access determination engine 404 may generate, receive/retrieve (e.g., through the communication system 406), and/or otherwise determine the LAG access determination information discussed below and store that LAG access determination information in the LAG access determination database 408. As discussed below, the LAG access determination information may include topology information for the LAG access node determination system 200, hop information associated with each of the networking node devices in the LAG access node determination system 200, bandwidth availability information associated with link(s) to each of the networking node devices in the LAG access node determination system 200, latency associated with link(s) to each of the networking node devices in the LAG access node determination system 200, and/or a variety of other LAG access determination information that would be apparent to one of skill in the art in possession of the present disclosure. Furthermore, the LAG access determination engine 404 may be configured to update LAG access determination information stored in the LAG access determination database 408 before, during, and/or subsequent to the operation of the LAG access node determination system 200 discussed below.

Figure 5:
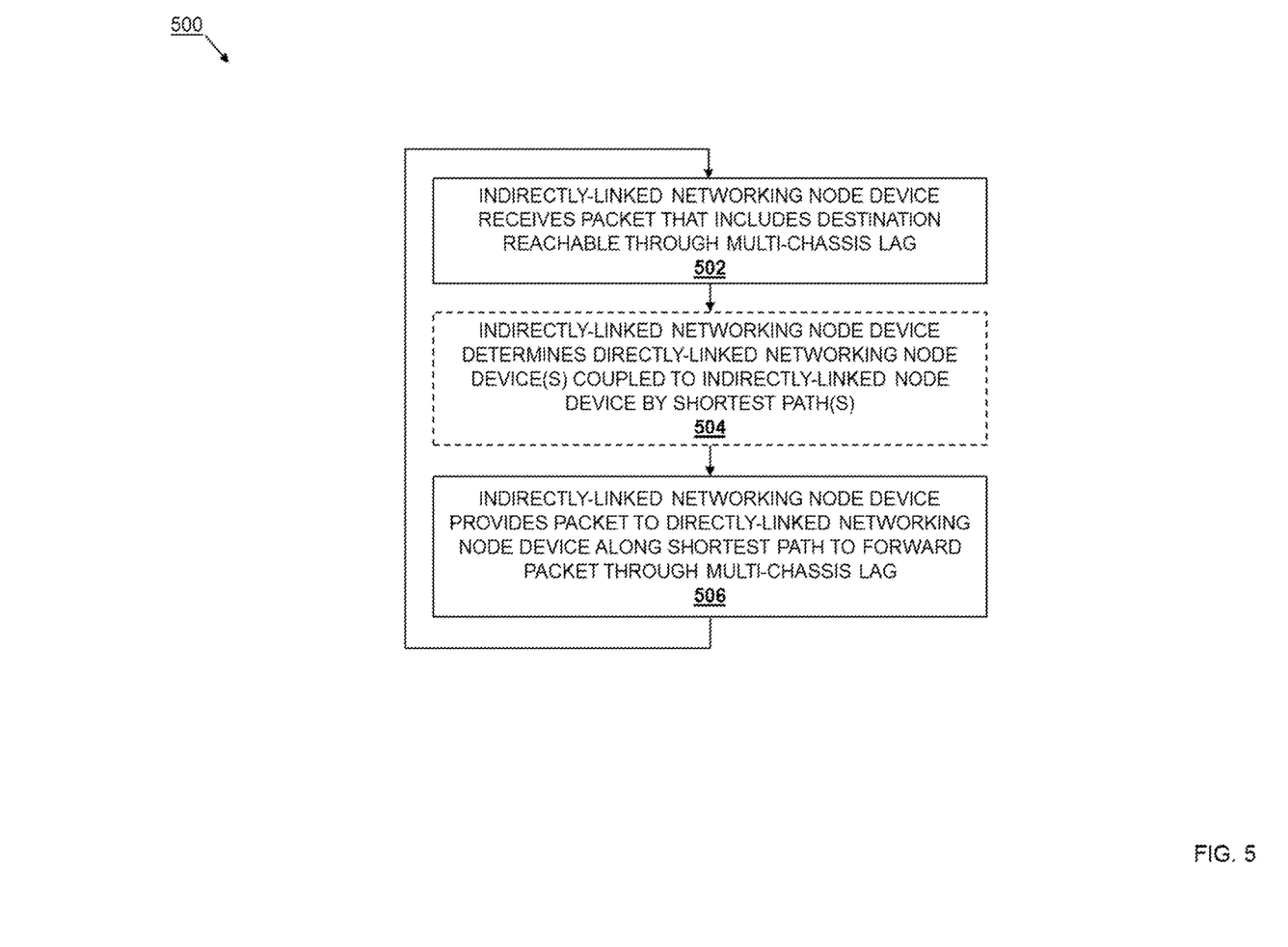
FIG. 5 is a flow chart illustrating an embodiment of a method for determining a LAG access node.

Referring now to FIG. 5, an embodiment of a method 500 for forwarding a packet through a multi-chassis LAG is illustrated. As discussed above, in conventional multi-chassis LAG systems, when an indirectly-linked networking node device receives traffic that must enter networking switch device using a multi-chassis LAG, that indirectly-linked networking node device must send that traffic through a directly-linked networking node device that has been designated as a LAG access networking node that is used by all of the indirectly-linked networking node devices to send traffic that must enter the networking switch device using the multi-chassis LAG. Such conventional multi-chassis LAG systems suffer from non-optimal traffic routing and a lack of load balancing, and solutions that designate different LAG access networking nodes for subsets of the indirectly-linked networking node devices to provide load balancing may still result in non-optimal networking node devices being designated for any particular indirectly-linked networking node device that result in traffic delays and/or reduced throughput. The LAG access node determination system of the present disclosures prevents such traffic delays and/or reduced throughput by have indirectly-linked networking node device(s) determine the shortest path to a directly-linked networking node device that will provide access to the multi-chassis LAG, and providing traffic having a destination that is accessed through the multi-chassis LAG to that directly-linked networking node device for forwarding through the multi-chassis LAG. As discussed below, the shortest path for an indirectly-linked networking node device to a directly-linked networking node device may change as the situation in the network changes, and the indirectly-linked networking node device(s) may redetermine their shortest path to access the multi-chassis LAG in response to ensure the directly-linked networking node device being used to access the multi-chassis LAG is the optimal directly-linked networking node device.

Figure 6:
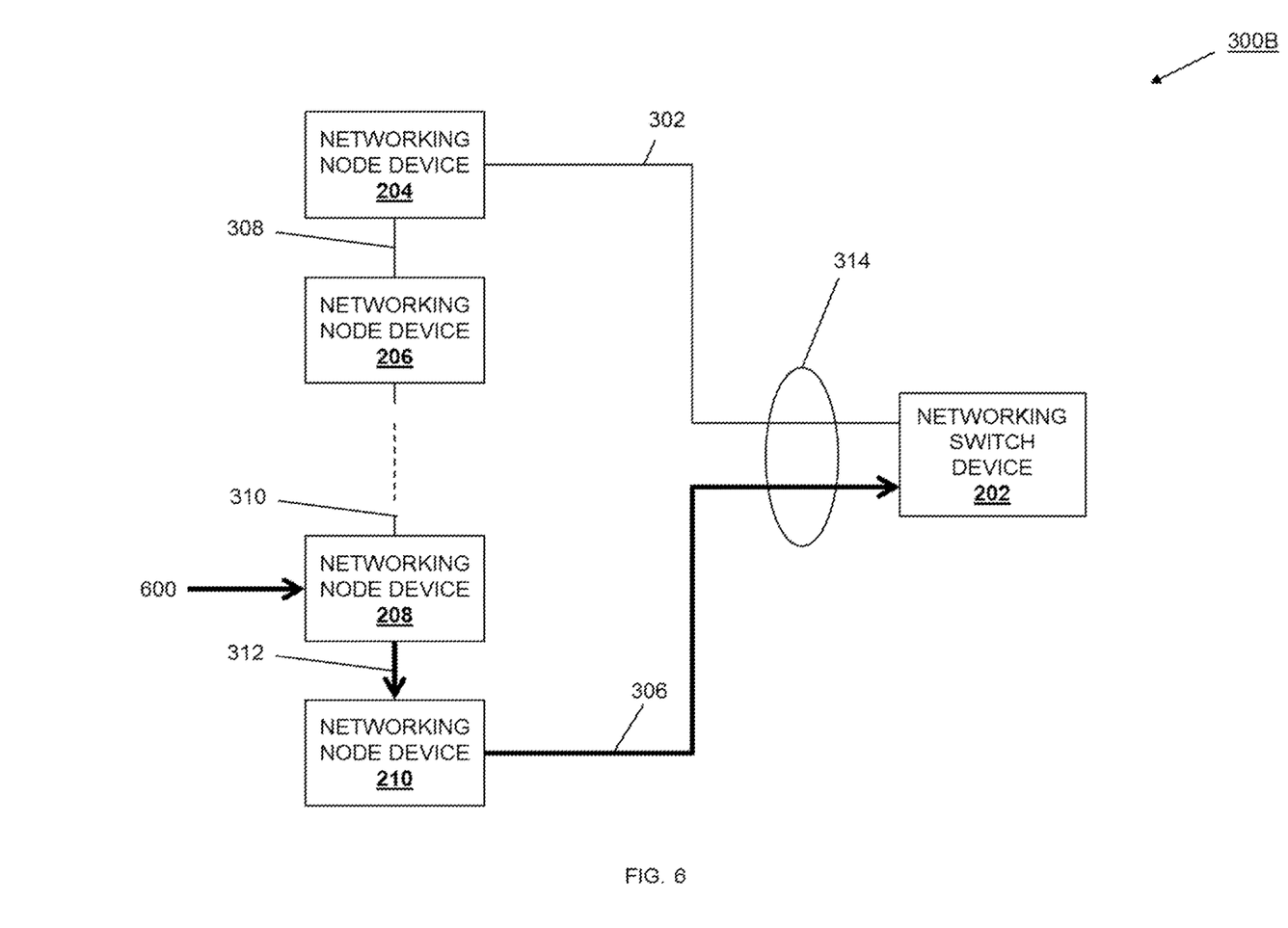
FIG. 6 is a schematic view illustrating an embodiment of the accessing of the multi-chassis LAG of FIG. 3B.

The embodiment of the method 500 is discussed below with regard to the second networked situation 300B, and with references to the first networked situation 300A, but one of skill in the art in possession of the present disclosure will recognize that other networked situations will benefit from method 500 and thus will fall within its scope. The method 500 begins at block 502 where an indirectly-linked networking node device receives a packet that includes a destination that is reachable through a multi-chassis LAG. For example, the indirectly-linked networking node device may receive Broadcast, Unknown unicast, and/or Multicast (BUM) traffic that includes the first packet. With reference to FIG. 6, in an embodiment, the indirectly-linked networking node device 208 may receive a packet 600 (e.g., from the host device 212c) that includes a destination (e.g., a destination Media Access Control (MAC) address)) of one or more of the server devices 216a-d that are reachable through the multi-chassis LAG 314 provided by the networking switch device 202. Using the example above where the networking switch device 202 provides the multi-chassis LAG as a VLT LAG, the LAG access determination engine 404 may receive the packet through the communication system 406 and determine that the packet includes a destination that is reachable through a VLT port provided by the VLT LAG. As discussed above, the indirectly-linked networking node device 208 may not be directly linked to the networking switch device 202 due to the lack of a direct network connection between the networking node device 208 and the network switch device 202.

Figure 7:
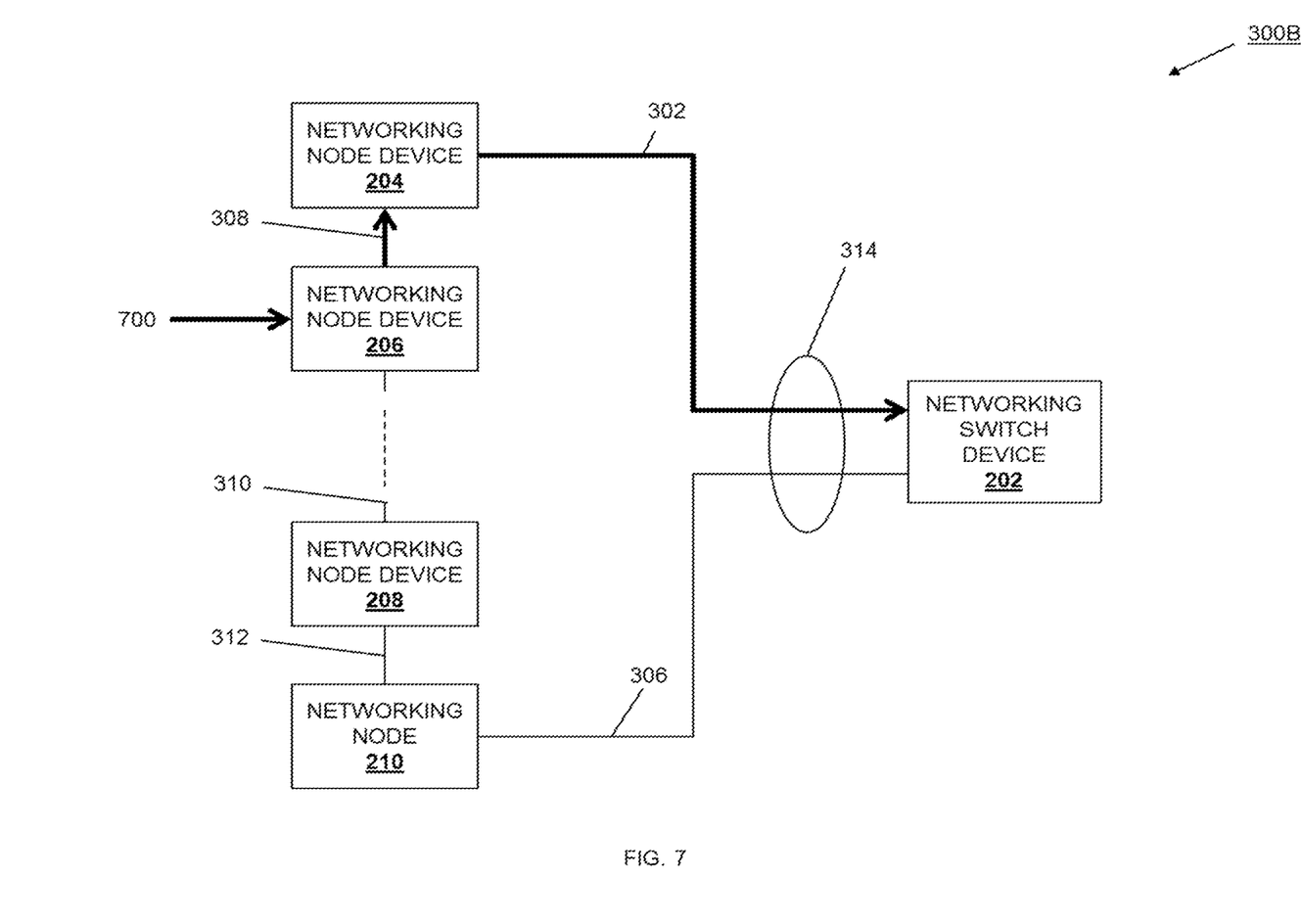
FIG. 7 is a schematic view illustrating an embodiment of the accessing of the multi-chassis LAG of FIG. 3B.

With reference to FIG. 7, in an embodiment, the indirectly-linked networking node device 206 may receive a packet 700 (e.g., from the host device 212b) that includes a destination (e.g., a destination Media Access Control (MAC) address)) of one or more of the server devices 216a-d that are reachable through the multi-chassis LAG 314 provided by the networking switch device 202. Using the example above where the networking switch device 202 provides the multi-chassis LAG as a VLT LAG, the LAG access determination engine 404 may receive the packet through the communication system 406 and determine that the packet includes a destination that is reachable through a VLT port provided by the VLT LAG. As discussed above, the indirectly-linked networking node device 206 may not be directly linked to the networking switch device 202 due to the unavailability of a link (e.g., the one or more links 304 illustrated in FIG. 3A) provided by the direct network connection 206a, due to a lack of a direct network connection between the networking node device 206 and the network switch device 202, and/or in response to a variety of other link unavailability scenarios known in the art.

The method 500 then proceeds to optional block 504 where the indirectly-linked networking node device determines one or more directly-linked networking node devices that are coupled to the indirectly-linked networking node device by one or more shortest paths. While block 504 is illustrated and described as optional, one of skill in the art in possession of the present disclosure will recognize that block 504 will be performed at least once (e.g., upon a first performance of the method 500) and then may be optional when the method 500 is repeated. Furthermore, while block 504 is illustrated as being performed after the receiving of the packet at block 502, in some embodiments, block 504 may be performed prior to receiving the packet at block 502. As such, the LAG access networking nodes may be statically determined (e.g., prior to receiving packets) and/or dynamically determined (e.g., as packets are received). With reference to FIG. 6, in an embodiment of block 504, the indirectly-linked networking node device 208 may operate to determine one of the directly-linked networking node devices 204 or 210 that is coupled to the indirectly-linked networking node device 208 by a shortest path. With reference to FIG. 7, in an embodiment of block 504, the indirectly-linked networking node device 206 may operate to determine one of the directly-linked networking node devices 204 or 210 that is coupled to the indirectly-linked networking node device 206 by a shortest path.

In either of the networking node devices 206 and 208, at block 504 the LAG access determination engine 404 may access the LAG access determination database 408 to determine one or more directly-linked networking node devices that are coupled to the indirectly-linked networking node device 400 by a shortest path. As discussed above, the LAG access determination database 408 may include LAG access determination information such as topology information for the LAG access node determination system 200, hop information associated with one or more of the networking node devices in the LAG access node determination system 200, bandwidth availability information associated with one or more of the networking node devices in the LAG access node determination system 200, flow information about data traffic flows between any of the networking node devices, Virtual Local Area Network (VLAN) information about VLANs provided and/or access through any of the networking nodes devices, and/or a variety of other LAG access determination information, and at block 504 the LAG access determination engine 404 use any part of that LAG access determination information and/or combinations of that LAG access determination information to determine one or more directly-linked networking node devices that are coupled to the indirectly-linked networking node device 400 by a shortest path.

In one example of block 504, the LAG access determination engine 404 may use hop information associated with one or more of the networking node devices in the LAG access node determination system 200 to determine a hop-count between the indirectly-linked networking node device and the directly-linked networking node devices in the LAG access node determination system 200, and then determine that one or more of those hop-counts provides the shortest path to that hop-counts associated directly-linked networking node device. In an embodiment, such hop information may be generated, received/retrieved, and/or otherwise determined (prior to block 504 or during block 504) using a topology of the LAG access node determination system 200. For example, the LAG access determination engine 404 may determine the topology of the LAG access node determination system 200 (e.g., once, periodically, in response to changes in the network) and store that topology in the LAG access determination database 408, and at block 504 may use that topology to determine the hop-counts to the directly-linked networking node devices. The LAG access determination engine 404 may then compare those hop-counts to determine the hop count(s) with the lowest number of hops, and thus the shortest path(s) to the respective directly-linked networking node device(s). In some embodiments, the LAG access determination engine 404 may use routing protocols such as Spanning Tree Protocols (xSTP), discovery protocols, and/or other protocols known in the art to determine a "distance" between the indirectly-linked networking node device and directly-linked networking node devices.

In one embodiment, a single hop-count associated with a single directly-linked networking node device may provide the lowest number of hops to a directly-linked networking node device, and the LAG access determination engine 404 may select that directly-linked networking node device as a LAG access networking node for its indirectly-linked networking node. For example, with reference to FIG. 6, the hop-count between the indirectly-linked networking node device 208 and the networking node device 210 provides the lowest number of hops (and thus shortest path in this embodiment) to a directly-linked networking node device for the networking node device 208 (e.g., as compared to the hop-count between the indirectly-linked networking node device 208 and the networking node device 204), which may cause the LAG access determination engine 404 in the networking node device 208 to select the directly-linked networking node device 210 as its LAG access networking node. Similarly, with reference to FIG. 7, the hop-count between the indirectly-linked networking node device 206 and the networking node device 204 provides the lowest number of hops (and thus shortest path in this embodiment) to a directly-linked networking node device for the networking node device 206 (e.g., as compared to the hop-count between the indirectly-linked networking node device 206 and the networking node device 210), which may cause the LAG access determination engine 404 in the networking node device 206 to select the directly-linked networking node device 204 as its LAG access networking node. However, as discussed below, in some situations there may be more than one hop-count that provides an equal or substantially equal number of hops between the indirectly-linked networking node device and more than one respective directly-linked networking node device.

In another example of block 504, the LAG access determination engine 404 may use bandwidth availability information associated with the link(s) to one or more of the networking node devices in the LAG access node determination system 200 to determine a bandwidth available between the indirectly-linked networking node device and the directly-linked networking node devices in the LAG access node determination system 200, and then determine that the bandwidth available between the indirectly-linked networking node device and one or more directly-linked networking node device provides the shortest path. Such bandwidth availability information may be generated, received/retrieved, and/or otherwise determined (prior to block 504 or during block 504) by the LAG access node determination system 200. For example, the LAG access determination engine 404 may communicate with the networking node devices in the LAG access determination system 200 (e.g., once, periodically, in response to changes in the network) to determine bandwidth available information and store that bandwidth availability information in the LAG access determination database 408 (e.g., using customized logic to assign bandwidth/weight to different types of interfaces, and/or using other techniques known in the art), and at block 504 may use that bandwidth availability information to determine the bandwidth available to the directly-linked networking node devices. The LAG access determination engine 404 may then compare the bandwidth available to different directly-connected networking node devices to determine the directly-connected networking node devices to which the highest bandwidth is available, and thus the shortest path(s) to the respective directly-linked networking node device(s). In some embodiments, the LAG access determination engine 404 may use discovery protocols and/or other protocols known in the art to determine bandwidths available between the indirectly-linked networking node device and directly-linked networking node devices.

In one embodiment, the bandwidth available to a single directly-connected networking node device may be the highest bandwidth available to any of the directly-linked networking node devices, and the LAG access determination engine 404 may select that directly-linked networking node device as a LAG access networking node for its indirectly-linked networking node. For example, with reference to FIG. 6, the bandwidth available from the indirectly-linked networking node device 208 to the directly-linked networking node device 204 (e.g., via 100 GB links 310 and 308) may provide a higher bandwidth (and thus shortest path in this embodiment despite its higher hop-count) than the bandwidth available to the directly-linked networking node device 210 (e.g., via a 1 GB link 312), which may cause the LAG access determination engine 404 in the networking node device 208 to select the directly-linked networking node device 204 as its LAG access networking node. Similarly, with reference to FIG. 7, the bandwidth available from the indirectly-linked networking node device 206 to the directly-linked networking node device 210 (e.g., via 100 GB links 310 and 312) may provide a higher bandwidth (and thus shortest path in this embodiment despite its higher hop-count) than the bandwidth available to the directly-linked networking node device 204 (e.g., via a 1 GB link 308), which may cause the LAG access determination engine 404 in the networking node device 206 to select the directly-linked networking node device 210 as its LAG access networking node. However, as discussed below, in some situations the bandwidth available between the indirectly-linked networking node device and more than one directly-linked networking node device may be equal or substantially equal.

In other embodiments, a directly-linked networking node device may be associated with more than one shortest path to an indirectly-linked networking node device. For example, an indirectly-linked networking node device may be coupled to a directly-linked networking node device by first network connection(s) that provide first link(s) associated with a first shortest path to the directly-linked networking node device, and by second network connection(s) that provide second link(s) associated with a second shortest path to the directly-linked networking node device. In the event the first shortest path and the second shortest path are equal or substantially equal, a deterministic or heuristic algorithm may be employed to select one of the first shortest path and second shortest path. For example, if the LAG access node determination system 200 includes an ICL loop, the deterministic or heuristic algorithm may be used consistently with the algorithm that breaks the ICL loop.

As discussed above, in some situations, the shortest paths between the indirectly-linked networking node device and more than one directly-linked networking node device may be equal or substantially equal (e.g., an equal or substantially equal hop-count or available bandwidth). For example, substantially equal hop-counts may include a relatively high number of hops that are close in value (e.g., 15 hops and 16 hops), and substantially equal bandwidth availability may include relatively high bandwidths that are close in value (e.g., 100 GB and 110 GB). In those situations, other LAG access determination information may be utilized by the LAG access determination engine 404 to select one of those directly-linked networking node devices as the LAG access networking node for the indirectly-connected networking node device. In an embodiment, when hop-count is used as primary LAG access determination information for determining the shortest path to a directly-linked networking node device and more than one shortest path is determined that include an equal or substantially hop-count, the LAG access determination engine 404 may utilize bandwidth availability information as secondary LAG access determination information to "break the tie" and select one of those directly-linked networking node devices as the LAG access networking node for its indirectly-linked networking node device. As such, if an indirectly-linked networking node device determines two shortest paths to two different directly-linked networking nodes that each have an equal or substantially equal hop-count, but the bandwidth available to a first of those directly-linked networking node devices is lower (e.g., at least one of the network connections provides a 1 GB link to that directly-linked networking node device) than the bandwidth available to a second of those directly-linked networking node devices (e.g., all of the network connections to that directly-linked networking node device provide 100 GB links), then the second of those directly-linked networking node devices may be selected as the LAG access networking node for that indirectly-linked networking node device.

Similarly, when available bandwidth is used as primary LAG access determination information for determining the shortest path to a directly-linked networking node device and the bandwidth available to more than one directly-linked networking node devices is equal or substantially equal, the LAG access determination engine 404 may utilize hop information as secondary LAG access determination information to "break the tie" and select one of those directly-linked networking node devices as the LAG access networking node for its indirectly-linked networking node device. As such, if an indirectly-linked networking node device determines two shortest paths to two different directly-linked networking nodes that each have equal or substantially equal available bandwidth, but the number of hops to a first of those directly-linked networking node devices is lower than the number of hops to a second of those directly-linked networking node devices, then the first of those directly-linked networking node devices may be selected as the LAG access networking node for that indirectly-linked networking node device. While hop-count and bandwidth availability have been discussed as being used to break a tie between two equal or substantially equal shortest paths, one of skill in the art in possession of the present disclosure will recognize that other network information may be used to break shortest path ties such as, for example, MAC addresses of the directly-linked networking node devices with the equal or substantially equal shortest paths. In specific examples, data traffic flows (or traffic directed to VLANs) may be split over multiple shortest paths such that a first data traffic flow (or traffic directed to a first VLAN) that is received at the indirectly-linked networking node device is routed over the first shortest path, a second data traffic flow (or traffic directed to a second VLAN) that is received at the indirectly-linked networking node device is routed over the second shortest path, and so on.

In some embodiments, the LAG access determination engine 404 may select one or more additional directly-linked networking node devices as failover LAG access networking node devices in addition to the selection of one of the directly-linked networking node devices as the primary LAG access networking node. In such embodiments, the failover LAG access networking node device may be selected for a second shortest path between the indirectly-linked networking node device and the failover LAG access networking node device(s) (determined similarly as discussed above) that is greater than or equal to a first shortest path between the indirectly-linked networking node device and the primary LAG access networking node device (determined as discussed above). For example, with reference to FIG. 6, in addition to the LAG access determination engine 404 in the networking node device 208 selecting the directly-linked networking node device 210 as its primary LAG access networking node, the LAG access determination engine 404 in the networking node device 208 may select the directly-linked networking node device 204 as its failover LAG access networking node. Similarly, with reference to FIG. 7, in addition to the LAG access determination engine 404 in the networking node device 206 selecting the directly-linked networking node device 204 as its primary LAG access networking node, the LAG access determination engine 404 in the networking node device 206 may select the directly-linked networking node device 210 as its failover LAG access networking node. Similarly as discussed above, "ties" between second shortest paths to potential failover LAG access networking node devices may be broken in substantially the same manner as with first shortest paths to primary LAG access networking node devices. In an embodiment, the LAG access determination engine 404 in an indirectly-linked networking node device may provide packets to failover LAG access networking node devices via the second shortest path (discussed in further detail below) when the first shortest path to the primary LAG access networking node device is determined to be unavailable.

As such, while the term "shortest path" in the present disclosure may refer to a single shortest path to a directly-linked networking node device, in some embodiment, "shortest paths" may include both a first shortest path to a directly-linked networking node device, as well as at least one second shortest path to at least one directly-linked networking node device that may not be the absolute shortest path to one of the directly-linked networking node device, but that may provider a shorter path than is available to the remaining directly-linked networking node devices. While specific examples have been provided for determining shortest paths between indirectly-linked networking node devices and directly-linked networking node devices using hop-counts and bandwidth availability, one of skill in the art in possession of the present disclosure will recognize that other network and/or communication metrics may be utilized in determining a shortest path between two networking node devices in the LAG access node determination system 200. As such, a wide variety of LAG access determination information is envisioned as being used with the LAG access node determination system 200 in performance of the method 500 falling within the scope of the present disclosure.

The method 500 then proceeds to block 506 where the indirectly-linked networking node device provides the packet to the directly-linked networking node device along the shortest path to forward the packet through the multi-chassis LAG. In an embodiment, the LAG access determination engine 404 may provide the packet received at block 502 to the directly-linked networking node device that was determined at block 504 to provide the shortest path from its indirectly-linked networking node device to the multi-chassis LAG. For example, with reference to FIG. 6, the LAG access determination engine 404 in the indirectly-linked networking node device 208 may provide the packet 600 to the directly-linked networking node device 210 that was selected as its LAG access networking node, which causes the directly-linked networking node device 210 to forward the packet 600 through the multi-chassis LAG 314 to its destination (e.g., one of the server devices 216a-d coupled to the networking switch device 202). Similarly, with reference to FIG. 7, the LAG access determination engine 404 in the indirectly-linked networking node device 206 may provide the packet 700 to the directly-linked networking node device 204 that was selected as its LAG access networking node, which causes the directly-linked networking node device 204 to forward the packet 700 through the multi-chassis LAG 314 to its destination (e.g., one of the server devices 216a-d coupled to the networking switch device 202).

The method 500 may then return to block 502 where the indirectly-linked networking node device receives another packet that includes a destination reachable through the multi-chassis LAG substantially as discussed above. Following the receiving of that packet at block 502, optional block 504 may or may not be performed. For example, optional block 504 may only be performed by the indirectly-linked networking node device in response to a change in network properties. In other examples, optional block 504 may be performed each time the method 500 is performed, but may only result in a difference in system operation when a change in network properties has occurred. Changes in network properties may include the connection of a new directly-linked or indirectly-linked networking node device to the LAG access determination system 200, the removal of a directly-linked or indirectly-linked networking node device from the LAG access determination system 200, the new availability or unavailability of a link the LAG access determination system 200, a change in bandwidth on a link the LAG access determination system 200, and/or due to a variety of other changes in network properties known in the art.

For example, the LAG access determination engine 404 in an indirectly-linked networking node device may determine that an original topology of the LAG access node determination system 200 has changed to a new topology, bandwidth availability changes have occurred, or any of a variety of other networking property changes have occurred and, in response, determine a different directly-linked networking node device that is coupled to its indirectly-linked networking node device by a different shortest path substantially at block 504 as discussed above. The method 500 may then proceed to block 506 where the packet is then provided to the different directly-linked networking node device along the different shortest path to forward that packet through the multi-chassis LAG substantially as discussed above.

Thus, systems and methods have been described that provides first networking node devices, which do not include a direct link to a networking switch device that is part of a multi-chassis LAG, that determine second networking node devices, which have a direct link to the networking switch device that is part of the multi-chassis LAG, that provide the shortest path between the first networking node device and one of the second networking node devices, and then provide packets that must be forwarded through the multi-chassis LAG to reach their destination to that second networking node device for forwarding through the multi-chassis LAG. The systems and methods of the present disclosure provide for load balancing in a multi-chassis LAG environment while also reducing traffic delays and increasing throughput relative to conventional multi-chassis LAG systems by ensuring that any indirectly-linked networking node device in the system will utilize the shortest path (e.g., determined by number of hops, bandwidth availability, etc.) in forwarding traffic through the multi-chassis LAG.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Link Aggregation Group (LAG) access node determination system, comprising:
   a plurality of server devices;
   a networking switch device that is coupled to the plurality of server devices;
   a plurality of directly-linked networking node devices that are each directly linked to the networking switch device by respective links that are aggregated in a multi-chassis LAG provided by the networking switch device; and
   an indirectly-linked networking node device that is coupled between the plurality of directly-linked networking node devices and that is not directly linked to the networking switch device, wherein the indirectly-linked networking node device is configured to:
      receive a first packet that includes a destination that is reachable through the multi-chassis LAG provided by the networking switch device;
      calculate, using LAG access determination information, a first shortest path that includes a first directly-linked networking node device of the plurality of directly-linked networking node devices that is coupled to the indirectly-linked networking node device by the first shortest path, wherein the first shortest path is calculated based on a hop-count between the indirectly-linked networking node device and the first directly-linked networking node device, and wherein the hop-count is calculated by the indirectly-linked networking node device using hop information included in the LAG access determination information, and wherein the hop information is generated using a first topology of the LAG access node determination system; and provide the first packet along the first shortest path to the first directly-linked networking node device in order to forward the first packet through the multi-chassis LAG.

2. The LAG access node determination system of claim 1, wherein the first shortest path is calculated using the LAG access determination information that includes bandwidth information associated with a bandwidth available between the indirectly-linked networking node device and the first directly-linked networking node device.

3. The LAG access node determination system of claim 1, wherein the indirectly-linked networking node device is configured to:
   generate a first topology of the plurality of directly-linked networking node devices using a routing protocol, wherein the first shortest path is calculated using the first topology.

4. The LAG access node determination system of claim 3, wherein the indirectly-linked networking node device is configured to:
   receive a second packet that includes a destination that is reachable through the multi-chassis LAG provided by the networking switch device;
   determine that the first topology of the plurality of directly-linked networking node devices has changed to a second topology;
   calculate, using the LAG access determination information, a second shortest path that is different than the first shortest path and that includes a second directly-linked networking node device of the plurality of directly-linked networking node devices that is coupled to the indirectly-linked networking node device by the second shortest path; and
   provide the second packet along the second shortest path to the second directly-linked networking node device in order to forward the second packet through the multi-chassis LAG.

5. The LAG access node determination system of claim 1, wherein the indirectly-linked networking node device is configured to:
   receive a second packet that includes a destination that is reachable through the multi-chassis LAG provided by the networking switch device;
   calculate, using the LAG access determination information, a second shortest path that is greater than or equal to the first shortest path and that includes a second directly-linked networking node device of the plurality of directly-linked networking node devices that is coupled to the indirectly-linked networking node device by the second shortest path;
   determine that the first shortest path is unavailable; and
   provide the second packet along the second shortest path to the second directly-linked networking node device in order to forward the second packet through the multi-chassis LAG.

6. An information handling system (IHS), comprising:
   a chassis;
   a communication system that is located in the chassis and configured to couple to a plurality of directly-linked networking node devices that are each directly linked to a networking switch device by respective links that are aggregated in a multi-chassis Link Aggregation Group (LAG) provided by the networking switch device, wherein the communication system is not directly linked to the networking switch device;
   a processing system that is located in the chassis and coupled to the communication system; and
   a memory system that is located in the chassis and coupled to the processing system and including instruction that, when executed by the processing system, cause the processing system to provide a LAG access determination engine that is configured to:
      receive, through the communication system, a first packet that includes a destination that is reachable through the multi-chassis LAG provided by the networking switch device;
      calculate, using LAG access determination information, a first shortest path that includes a first directly-linked networking node device of the plurality of directly-linked networking node devices that is coupled to the communication system by the first shortest path, wherein the first shortest path is calculated based on a hop-count between the communication system and the first directly-linked networking node device, and wherein the hop-count is calculated by the processing system using hop information included in the LAG access determination information, and wherein the hop information is generated using a first topology of the plurality of directly-linked networking node devices; and
      provide, through the communication system, the first packet along the first shortest path to the first directly-linked networking node device in order to forward the first packet through the multi-chassis LAG.

7. The IHS of claim 6, wherein the first shortest path is calculated using the LAG access determination information that includes bandwidth information associated with a bandwidth available between the communication system and the first directly-linked networking node device.

8. The IHS of claim 6, wherein the LAG access determination engine is configured to:
   generate a first topology of the plurality of directly-linked networking node devices using a routing protocol, wherein the first shortest path is calculated using the first topology.

9. The IHS of claim 8, wherein the LAG access determination engine is configured to:
   receive, through the communication system, a second packet that includes a destination that is reachable through the multi-chassis LAG provided by the networking switch device;
   determine that the first topology of the plurality of directly-linked networking node devices has changed to a second topology;
   calculate, using the LAG access determination information, a second shortest path that is different than the first shortest path and that includes a second directly-linked networking node device of the plurality of directly-linked networking node devices that is coupled to the communication system by the second shortest path; and
   provide, through the communication system, the second packet along the second shortest path to the second directly-linked networking node device in order to forward the second packet through the multi-chassis LAG.

10. The IHS of claim 6, wherein the LAG access determination engine is configured to:
    receive, through the communication system, a second packet that includes a destination that is reachable through the multi-chassis LAG provided by the networking switch device;
    calculate, using the LAG access determination information, a second shortest path that is greater than or equal to the first shortest path and that includes a second directly-linked networking node device of the plurality of directly-linked networking node devices that is coupled to the communication system by the second shortest path;

determine that the first shortest path is unavailable; and provide, through the communication system, the second packet along the second shortest path to the second directly-linked networking node device in order to forward the second packet through the multi-chassis LAG.

11. An information handling system (IHS), comprising:
a chassis;
a communication system that is located in the chassis and configured to couple to a plurality of directly-linked networking node devices that are each directly linked to a networking switch device by respective links that are aggregated in a multi-chassis Link Aggregation Group (LAG) provided by the networking switch device, wherein the communication system is nor directly linked to the networking switch device;
a processing system that is located in the chassis and coupled to the communication system; and
a memory system that is located in the chassis and coupled to the processing system and including instruction that, when executed by the processing system, cause the processing system to provide a LAG access determination engine that is configured to:
  receive, through the communication system, a first packet that includes a destination that is reachable through the multi-chassis LAG provided by the networking switch device;
  calculate, using LAG access determination information, a first shortest path that includes a first directly-linked networking node device of the plurality of directly-linked networking node devices that is coupled to the communication system by the first shortest path;
  calculate, using hop information included in the LAG access determination information, a second shortest path between a second directly-linked networking node device of the plurality of directly-linked networking node devices that is coupled to the communication system by the second shortest path, wherein the second shortest path is equal to the first shortest path based on a respective hop-count between the communication system and each of the first directly-linked networking node device and the second directly-linked networking node device;
  determine one of the first shortest path and the second shortest path for forwarding packets using bandwidth information included in the LAG access determination information on a respective bandwidth available between the communication system and each of the first directly-linked networking node device and the second directly-linked networking node device; and
  provide, through the communication system and in response to determining the first shortest path forwarding packets using the bandwidth information, the first packet along the first shortest path to the first directly-linked networking node device in order to forward the first packet through the multi-chassis LAG.

12. A method for forwarding a packet through a multi-chassis Link Aggregation Group (LAG), comprising:

receiving, by a indirectly-linked networking node device, a first packet that includes a destination that is reachable through a multi-chassis LAG provided by a networking switch device;

calculating, by the indirectly-linked networking node device that is not directly linked to the networking switch device that provides a multi-chassis LAG using respective direct links to a plurality of directly-linked networking node devices and using LAG access determination information, a first shortest path that includes a first directly-linked networking node device of the plurality of directly-linked networking node devices that is coupled to the indirectly-linked networking node device by the first shortest path, wherein calculating the first shortest path is based on a hop-count between the indirectly-linked networking node device and the first directly-linked networking node device, and wherein the hop-count is calculated by the indirectly-linked networking node device using hop information included in the LAG access determination information, and wherein the hop information is generated using a first topology of the directly-linked networking node devices; and providing, by the indirectly-linked networking node device, the first packet along the first shortest path to the first directly-linked networking node device in order to forward the first packet through the multi-chassis LAG.

13. The method of claim 12, wherein calculating the first shortest path includes using the LAG access determination information that includes bandwidth information associated with a bandwidth available between the indirectly-linked networking node device and the first directly-linked networking node device.

14. The method of claim 12, further comprising:
generating, by the indirectly-linked networking node device using a routing protocol, a first topology of the plurality of directly-linked networking node devices, wherein the first shortest path is calculated using the first topology.

15. The method of claim 14, further comprising:
receiving, by the indirectly-linked networking node device, a second packet that includes a destination that is reachable through the multi-chassis LAG provided by the networking switch device;
determining, by the indirectly-linked networking node device, that the first topology of the plurality of directly-linked networking node devices has changed to a second topology;
calculating, by the indirectly-linked networking node device using the LAG access determination information, a second shortest path that is different than the first shortest path and that includes a second directly-linked networking node device of the plurality of directly-linked networking node devices that is coupled to the indirectly-linked networking node device by the second shortest path; and
providing, by the indirectly-linked networking node device, the second packet along the second shortest path to the second directly-linked networking node device in order to forward the second packet through the multi-chassis LAG.

16. The method of claim 12, further comprising:
receiving, by the indirectly-linked networking node device, a second packet that includes a destination that is reachable through the multi-chassis LAG provided by the networking switch device;

calculating, by the indirectly-linked networking node device using the LAG access determination information, a second shortest path that is greater than or equal to the first shortest path and that includes a second directly-linked networking node device of the plurality of directly-linked networking node devices that is coupled to the indirectly-linked networking node device by the second shortest path;

determining, by the indirectly-linked networking node device, that the first shortest path is unavailable; and providing, by the indirectly-linked networking node device, the second packet along the second shortest path to the second directly-linked networking node device in order to forward the second packet through the multi-chassis LAG.

17. A method for forwarding a packet through a multi-chassis Link Aggregation Group (LAG), comprising:

receiving, by a indirectly-linked networking node device, a first packet that includes a destination that is reachable through a multi-chassis LAG provided by a networking switch device;

calculating, by the indirectly-linked networking node device that is not directly linked to the networking switch device that provides a multi-chassis LAG using respective direct links to a plurality of directly-linked networking node devices and using LAG access determination information, a first shortest path that includes a first directly-linked networking node device of the plurality of directly-linked networking node devices that is coupled to the indirectly-linked networking node device by the first shortest path;

calculating, by the indirectly-linked networking node device using hop information included in the LAG access determination information, a second shortest path that includes a second directly-linked networking node device of the plurality of directly-linked networking node devices that is coupled to the indirectly-linked networking node device by the second shortest path, wherein the second shortest path is equal to the first shortest path based on a respective hop-count between the indirectly-linked networking node device and each of the first directly-linked networking node device and the second directly-linked networking node device;

determining, by the indirectly-linked networking node device, one of the first shortest path and the second shortest path for forwarding packets using bandwidth information included in the LAG access determination information that is associated with a respective bandwidth available between the indirectly-linked networking node device and each of the first directly-linked networking node device and the second directly-linked networking node device; and providing, by the indirectly-linked networking node device and in response to determining the first shortest path for forwarding packets using the bandwidth information, the first packet along the first shortest path to the first directly-linked networking node device in order to forward the first packet through the multi-chassis LAG.

18. The method of claim 17, wherein the calculating the first shortest path is based on a hop-count between the indirectly-linked networking node device and the first directly-linked networking node device, and wherein the hop-count is calculated by the indirectly-linked networking node device using hop information included in the LAG access determination information, and wherein the hop information is generated using a first topology of the directly-linked networking node devices.

19. The method of claim 17, wherein the calculating the first shortest path includes using the LAG access determination information that includes bandwidth information associated with a bandwidth available between the indirectly-linked networking node device and the first directly-linked networking node device.

20. The method of claim 17, further comprising:

generating, by the indirectly-linked networking node device using a routing protocol, a first topology of the plurality of directly-linked networking node devices, wherein the first shortest path is calculated using the first topology.

* * * * *